US007712088B2

(12) United States Patent
Sonkin et al.

(10) Patent No.: US 7,712,088 B2
(45) Date of Patent: May 4, 2010

(54) METHOD AND SYSTEM FOR A BATCH PARSER

(75) Inventors: Dmitry Sonkin, Redmond, WA (US);
Bruce A. Prang, Woodinville, WA (US);
Marius Popa, Bellevue, WA (US);
Michiel J. Wories, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1151 days.

(21) Appl. No.: 10/886,990

(22) Filed: Jul. 8, 2004

(65) Prior Publication Data

US 2006/0010123 A1    Jan. 12, 2006

(51) Int. Cl.
*G06F 9/45* (2006.01)
(52) U.S. Cl. .................. 717/136; 717/106; 717/115; 717/143; 707/705; 707/755
(58) Field of Classification Search ................. 707/100; 717/106, 115
See application file for complete search history.

(56) References Cited

U.S. PATENT DOCUMENTS

| | | | | |
|---|---|---|---|---|
| 4,989,132 | A * | 1/1991 | Mellender et al. | 717/139 |
| 5,590,319 | A * | 12/1996 | Cohen et al. | 707/4 |
| 5,737,592 | A * | 4/1998 | Nguyen et al. | 707/4 |
| 5,854,930 | A * | 12/1998 | McLain et al. | 717/139 |
| 6,269,365 | B1 * | 7/2001 | Kiyoki et al. | 707/6 |
| 6,308,146 | B1 * | 10/2001 | La Cascia et al. | 703/22 |
| 6,470,349 | B1 * | 10/2002 | Heninger et al. | 707/102 |
| 6,507,948 | B1 * | 1/2003 | Curtis et al. | 717/174 |
| 6,523,172 | B1 * | 2/2003 | Martinez-Guerra et al. | 717/143 |
| 6,654,756 | B1 * | 11/2003 | Quernemoen et al. | 707/100 |
| 6,724,408 | B1 * | 4/2004 | Chen et al. | 715/853 |
| 6,925,630 | B1 * | 8/2005 | Britton et al. | 717/106 |
| 7,318,221 | B2 * | 1/2008 | Lin | 717/143 |
| 2002/0055921 | A1 * | 5/2002 | Yoshimura et al. | 707/9 |
| 2003/0158842 | A1 * | 8/2003 | Levy et al. | 707/3 |

OTHER PUBLICATIONS

Lee et al. "SemQL: A Semantic Query Language for Multidatabase Systems", 1999, Proceedings of the eighth international conference on Information and knowledge management, pp. 259-266.*

(Continued)

*Primary Examiner*—Lewis A Bullock, Jr.
*Assistant Examiner*—Jue Wang
(74) *Attorney, Agent, or Firm*—Woodcock Washburn LLP

(57) ABSTRACT

A method of generating commands for a database server includes accessing a script having parser-specific commands, a first set of database-specific commands and optional shell commands. A componentized batch parser splits out the different command types and converts the parser-specific commands into a second set of database-specific commands. The first set and second set of database-specific commands may be sent to a target database for execution. The optional shell commands may be executed by a user tool at a local console. The batch parser offers features including separation of parsing functions using batch separators, performing automatic substitution of tokens in the script with defined values or substitution of tokens by requesting token values via a client tool, stripping off comments and blanks spaces from processed commands, referencing and editing files outside the script, and the ability to connect to different servers.

30 Claims, 4 Drawing Sheets

OTHER PUBLICATIONS

Sheldon et al., "MCSE Exam 70-229: Microsoft SQL Server 2000 Database Design and Implementation—Training Kit", Microsoft Press, Apr. 2005, Lesson 4.*

Sybase Inc., Transact-SQL User's Guide, Aug. 2002, Chapter 13.*

Labrinidis, A. et al., "Generating Dynamic Content at Database-Backed Web Servers: cgi-bin vs mod_perl", *SIGMOD Record*, Mar. 2000, 29(1), 26-31.

Sorokine, A. et al., "Scripting in GIS Applications: Experimental Standards-Based Framework for Perl", *Geographic Information Systems, Proceedings of the eighth ACM International Symposium on Advances in Geographic Information Systems*, 2000, 102-107.

* cited by examiner

METHOD AND SYSTEM FOR A BATCH PARSER

FIELD OF THE INVENTION

This invention relates in general to the field of parsing computer inputs. More particularly, this invention relates to a componentized, reusable batch parser for computer software applications.

BACKGROUND OF THE INVENTION

Many software programs that accept user-generated inputs to process instructions include a parser as a basic feature of the software front end. A parser analyzes a sentence or language statement and breaks down words and symbols into functional units that can be converted into machine language. Many software programs have customized parsers written specifically for the purpose of the application where they reside. Thus every time a new application is authored, the parser may also require a rewrite because the embedded and customized parser written in a former application is too specific to the embedded application for generalized new use. This occurs frequently when parsers are embedded into compilers. A reusable and portable parser that is componentized could have benefits with respect to easing the programming burden associated with new applications and the added benefit of user familiarity from one new application to the next.

In a multiple database environment, programmers may be asked to make updates to multiple databases. Input statements to such applications as database management tools are often complex if programmers are asked to make multiple database changes. It is desirable to establish a more time and effort efficient technique of performing such multiple tasks with a single input script. For example, given an environment in which a user has to update one thousand rows of data on three separate servers, each server having five databases, the input statement can be quite large. In this instance, the user may have to generate a script that supplies the 1000 data changes, connect to a first server, run the script five times, once for each database on the server, disconnect from the server, connect to a second server, run the script another five times, once for each database, disconnect from the server, connect to a third server, and run the script another five times for the five databases in the third server. If the script being used is executed in a linear fashion, the user must generate at least 15,000 script lines; 1000 data change lines for three servers, each having five databases. Clearly, such script generation is a burden on the programming user. However, if a user were to create a generic script that contained special constructs understood by a script execution environment, this extra work of duplicating data 15 times could be saved. In that instance, a special parser may be needed in the execution environment to understand these special constructs. Although each execution environment can implement its own parser, such an approach could be unnecessarily costly and error prone because different implementations of the environment and the parser would behave slightly differently.

Thus, there is a need for a reusable componentized parser for use in a multiplicity of different applications. In addition, it would also be useful for the componentized parser to have features that further lessen the burden on programmers to provide extensive input statement simplifications in order for the parser to perform multiple tasks easily. The present invention addresses the aforementioned needs and solves them with additional advantages as expressed herein.

SUMMARY OF THE INVENTION

An embodiment of the invention includes a method to processes any batch language script containing special instructions for a batch processor. The script contains both target database commands and batch parser-specific commands. The batch parser automatically separates input script into parser-specific commands and database-specific commands and is able to execute the parser-specific commands to perform special functions. The special functions include separation of parsing functions using batch separators, performing automatic substitution of tokens in the script with defined values or substitution of tokens by requesting token values via client code, stripping off comments and blanks spaces from processed commands, referencing and editing files outside the script, and the ability to connect to different servers.

In one embodiment, a batch parser is able to provide database-specific commands to a target database for execution. The full set of database-specific commands that may be sent to the target database may include both explicit database-specific commands found in the input script and batch parser generated database commands which result from script commands to the parser. In one embodiment, the batch parser can reference and even permit editing of a reference file with a local text editor. Final database-specific commands resulting from the parser may be viewed and edited before being sent to the database target.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

An embodiment of the invention provides a component that can greatly simplify the manageability of a database server by providing a uniform batch language processing environment for script development and execution. The component can be embedded into any application and thus increase its versatility to a user.

In one embodiment, a batch parser can provide segregation of command types allowing database-specific commands to be routed to a database, batch parser-specific commands to be routed to the batch parser for interpretation and subsequent script generation, and client tool based commands to be routed to and executed by the client tool. Special features add flexibility to the batch parser and enhance its appeal as a component that is useful for script generation in a database environment.

Exemplary Embodiments of the Invention

Figure 1:
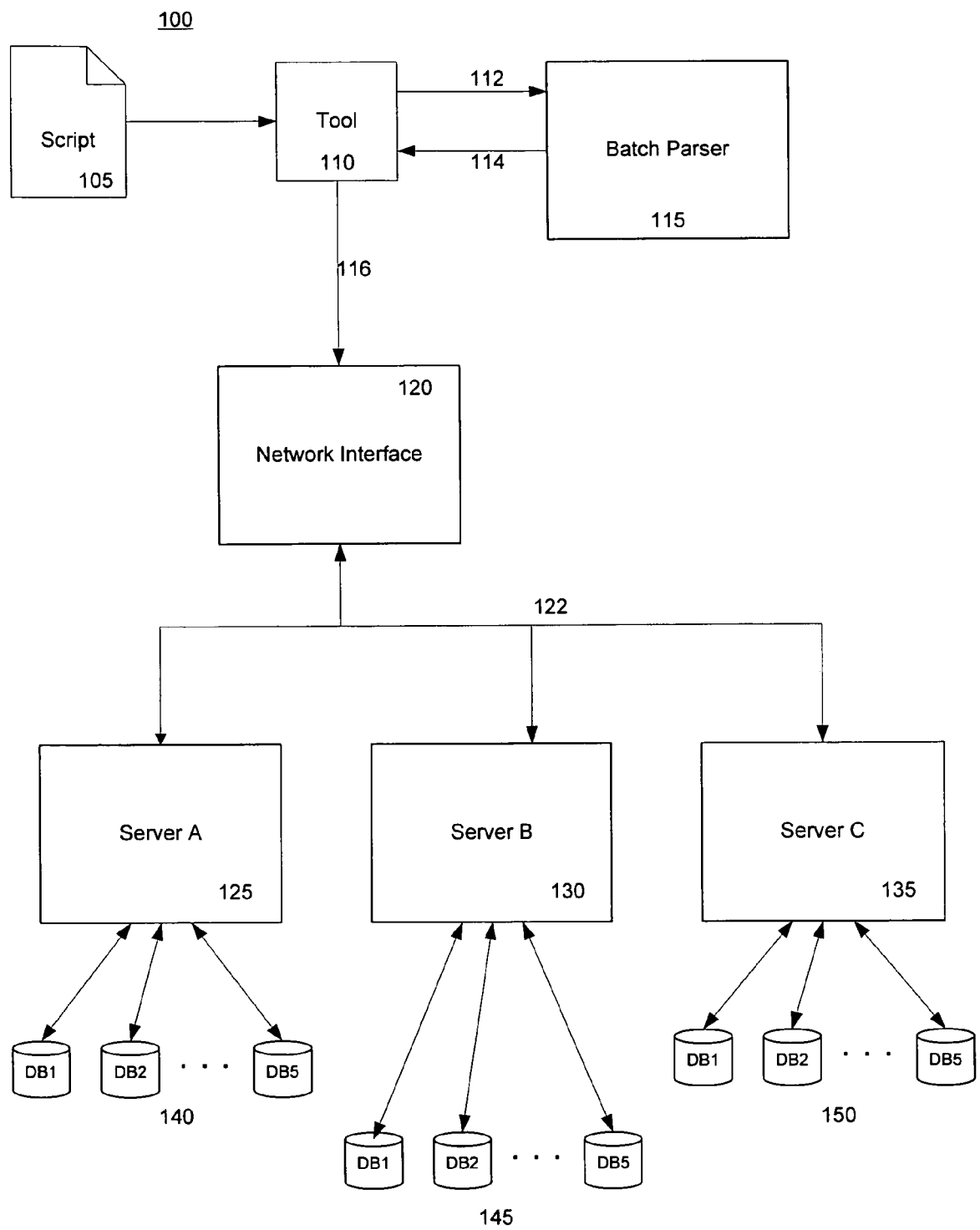
FIG. 1 is a block diagram of an exemplary system involving aspects of the invention.

FIG. 1 is a depiction of an exemplary environment 100 depicting aspects of the invention. In the FIG. 1 exemplary environment, a user may have the task of generating updates to three banks of five databases 140, 145, 150 which are associated with three servers 125, 130, and 135 respectively. As explained above, if a script 105 were generated by a user to perform a task requiring roughly 1K updates in each database, the script may have at least 15K lines and likely more. However, using aspects of the current invention, the script can be reduced significantly thereby lessening the burden on the user.

The exemplary embodiment of FIG. 1 depicts a script 105 which can serve as an instruction input to a tool 110. In one embodiment, the tool may be a tool which is commonly useful in accessing database information. Examples of such tools may be, for example, a SQL user interface program, such as a command line tool, a SQL Management Object (SMO) application, a Data Translation Services application, an NT Service, and an SAP application. All of these example tools have database access capability and may use aspects of the current invention.

The tool 110 can input the script 105 and pass the script to a batch parser 115 for interpretation of the instruction on the script. The batch parser 115 can input the script information via link 112. In the embodiment of FIG. 1, the batch parser is a component that can processes any batch language script 105 containing special instructions, such as tokens and commands to the batch parser itself. The parser can automatically split the script 105 text into batches allowing for any customer defined batch separator to define the batch size. The batch parser 115 may also optionally strip out comments and blanks present in the script 105.

In one embodiment, the batch parser 115 also allows a caller to provide automatic replacement of tokens. The tokens may have been previously defined or they may be replaced through dynamic substitution. The batch parser 115 can also execute special commands as they are encountered in the script. In one embodiment, the batch parser component is written as native C++ and managed NET class library.

In one embodiment, the batch parser 115 may separate out database commands from local batch parser commands. The batch parser commands may, for example, execute special commands requesting a substitution of tokens with code that allows a full list of database commands to be developed to manage the multiple tasks that the users wishes to be accomplished. Once the batch commands are generated, then the original script database commands and the newly generated database commands are assembled and moved out of the parser 115 via link 114 and given back to the tool 110. The tool may then send the fully assembled commands to a network interface 120 via link 116 for controlled distribution to server A, 125, server B, 130, and server C, 135 to access the respective database banks 140, 145, and 150.

Figure 2:
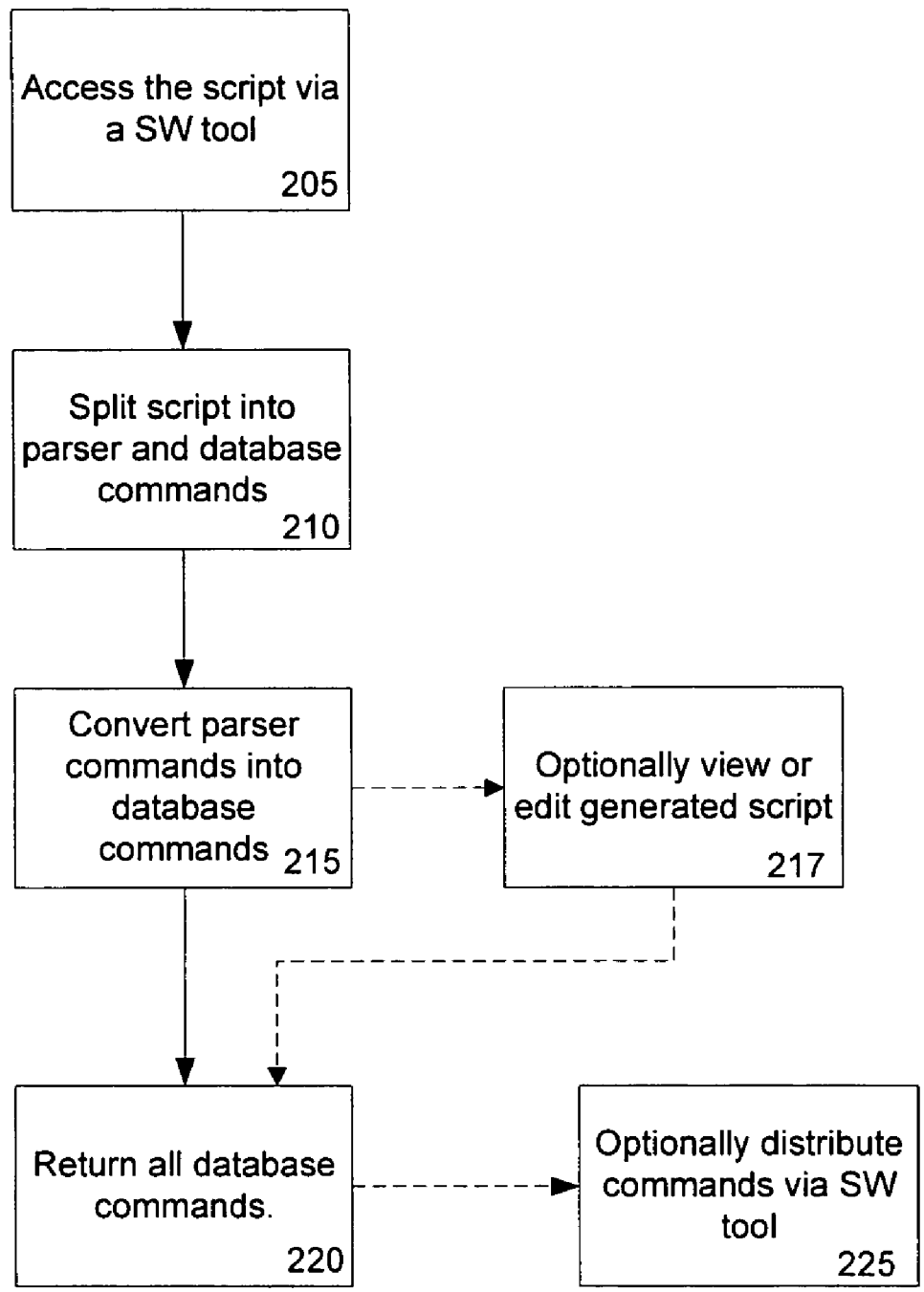
FIG. 2 is a exemplary flow diagram of an embodiment of the invention.

FIG. 2 is a flow diagram of a general flow 200 of the process involving the batch parser. Initially, a system embodying the batch parser component accesses the script (step 205). This step may be accomplished via a well known user interface. The user interface specifics may vary according to the tool or application program being used and may be a combination of typed input and file access type input. The script is then split (step 210) into batch parser commands and database commands. The batch parser uses the batch parser commands for immediate or delayed execution. Next, the batch parser converts the forwarded batch parser commands into database commands (step 215) according to special prompting statements provided in the script. Generally, the batch parser commands include special commands that allow the batch parser to make token substitutions for more convenient database command generation as well as other commands to be described below. Notice that the user may optionally view or edit the script generation (step 217). After the batch parser completes its special command conversion and database command generation, it assembles all of the database commands in the input script as well as the database commands generated as a result of execution of the special batch parser commands and returns a detailed script to the software tool (step 220). The software tool may then distribute the database commands according to its interface and control as if the user had input a fully detailed list of database commands for execution (step 225). It should be noted that the database commands need not be sent to the database target immediately. The scripted commands may be stored in either temporary longer term storage and executed at a later time.

An example script in accordance with the example given in FIG. 1 may be as follows:

EXAMPLE SCRIPT 1 set svr_name=server a
set db_name=db1
:r "myscript"
set db-name=db2
:r "myscript"
set db_name=db3
:r "myscript"
set db-name=db4
:r "myscript"
set db_name=db5
:r "myscript"
set svr_name=server b
set db_name=db1
:r "myscript"
set db-name=db2
:r "myscript"
set db_name=db3
:r "myscript"
set db-name=db4
:r "myscript"
set db_name=db5
:r "myscript"
set svr_name=server c
set db_name=db1
:r "myscript"
set db-name=db2
:r "myscript"
set db_name=db3
:r "myscript"
set db-name=db4
:r "myscript"
set db_name=db5
:r "myscript"

This example script uses the grammar :r to invoke a batch parser command. The example script uses the database update file "myscript" and sends it to five databases in each of three servers. In this example, the file myscript (not shown) is a set of database commands that is 1K in size. The example indicates the ease with which a user can accomplish the task of distributing the 1K database command file script to 15 different databases using an economy of user programming time and script storage space.

In another aspect of the invention, a token grammar $(database_name) may be used to prompt the batch parser to make substitutions for a token. A brief example script may be:

EXAMPLE SCRIPT 2

:SetVar server_name=svr1
:SetVar db_name=pubs
Connect $(server_name)
Use $(db_name)

The last two statements are examples of the dynamic substitution of tokens. First, server_name token will get its value during execution of the Connect command. Second, db_name will be interpreted in the context of Use command.

An additional example sustitution follws:
   :setvar db_name=pubs
   :setvar table_name=authors
   Use $(db_name)
   go
   Select * from titles
   Select * from $(table_name)
   Will result in the following
   Use pubs
   Select * from titles
   Select * from authors This example also illustrates that commands directed to a client tool, such as a database management tool (the "select" command above) as well as substituted variables may be interleaved before being sent to the client tool.

Figure 3:
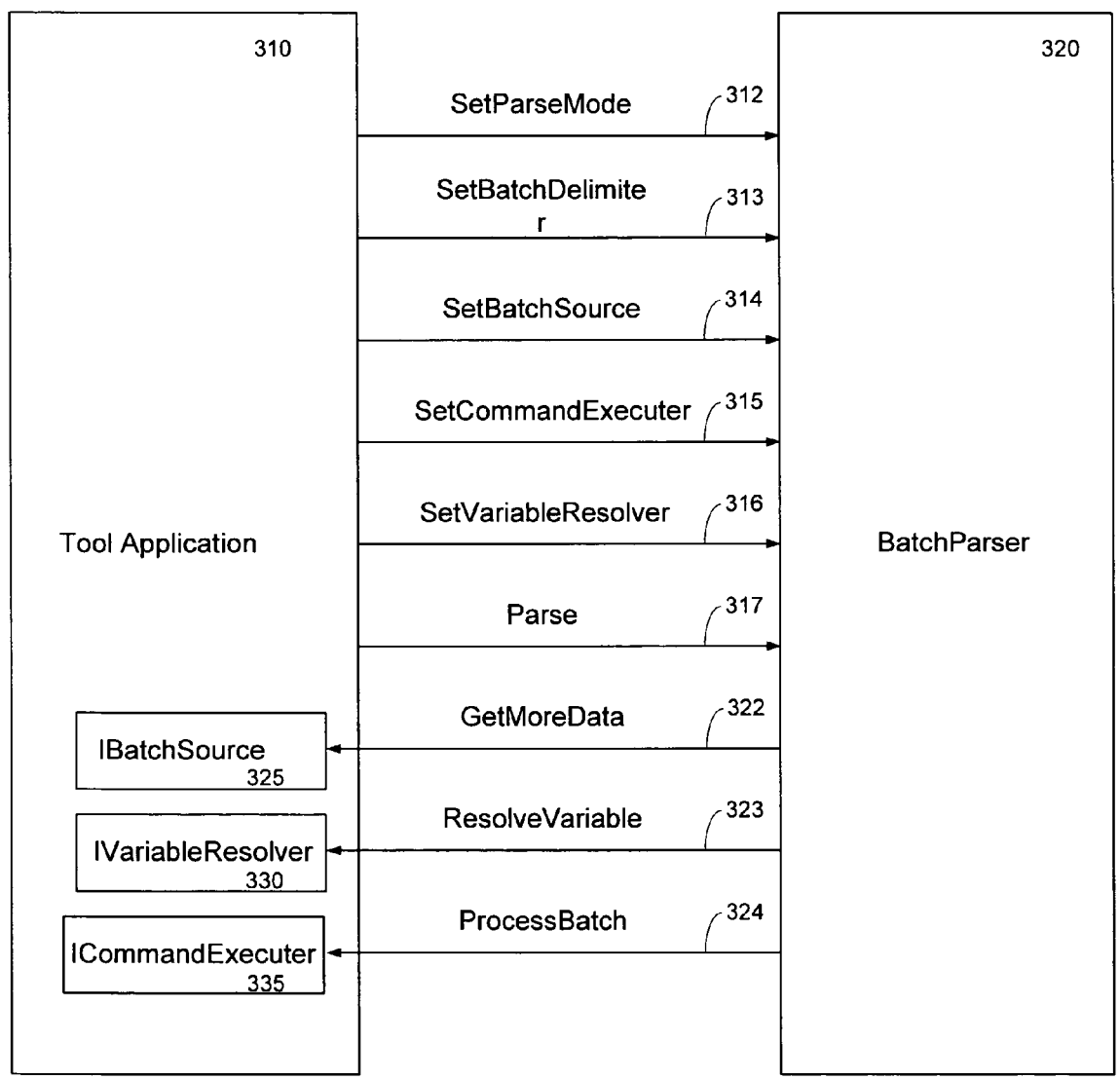
FIG. 3 is an exemplary call sequence diagram of an embodiment of the invention.

FIG. 3 depicts a call sequence diagram 300 for an embodiment of the invention. In FIG. 3, a tool application 300 communicates with a batch parser 320, using call actions 312-317. The batch parser 320 can respond to the tool 310 using call backs 322-324 which communicate with software modules 325, 330, 335 in the tool application.

In one embodiment, the set parse mode action call 312 from the tool 310 sets up the batch parser 320 for modes which include recognizing variables, commands, and batch delimiters, recognizing only batch delimiters, or recognizing only variables. An additional mode also allows for a software reset to clean up internal batch parser states in preparation for a new parse.

The set batch delimiter action call 313 sent from the tool 310 to the batch parser 320 is a method for setting a specific batch delimiter definition. Typically, this may be a symbol or character(s) such as "go" selected by the user. This symbol is used by the batch parser 320 to indicate the separation of one batch from another. The set batch source action call 314 is used to feed parser instruction data into the batch parser 320. The set command executer 315 is an action call to process the batch parser commands received via the batch source call 314. The set variable resolver call 316 allows the variable resolver interface to activate when a specific variable is needed from the user. The parse call 317 activates the parsing activity. This call can simulate the action of receiving a batch delimiter when parsing of a batch may proceed.

In the same embodiment, the batch parser 320 has three call back indicators; get more data 322, resolve variable 323 and process batch 324 whose names are descriptive of the call back actions. The get more data 322 call back can request more data of the IBatchSource 325 module in the tool 310. The get more data call 322 is used when the batch parser requests new data of the IvariableResolver module 330 of the tool 310. The resolve variable call back 324 is used when a specific variable value is requested of the user. The process batch call back 326 is used when the batch process requires the activation of the ICommandExecuter module 335 of the tool 310 to operate a batch execution. The specific exemplary software modules will be discussed further below.

In one embodiment, the batch parser component allows a user to perform multiple special functions or operations. One function is to split the input script into batches using any specified batch separator token as well as execute any batch a specified number of times. An example sequence is:
go
insert into mytable (col1, col2) values (1,2)
go 1000

This sequence takes the delimiter "go" and performs an insert command on the batch 1000 times. The batch parser can properly interpret the batch operations but the database that the client tool works with will likely not understand the batch commands and related grammar. Accordingly, the batch parser does not provide such commands and grammars, such as the batch separator "go", as part of the database commands provided by the parser. In one aspect of the invention, the parser can call the ICommandExecuter module to send parser generated commands to the tool database server via the tool.

In another aspect, the invention can automatically substitute tokens whose values were previously defined in the input script. In this aspect, a grammar of the tokens or markers can be expressed as $(server_name) and performs token replacement. For example, the following is batch parser language:
:setvar database_name=pubs
use $(database_name)

the variable pubs can be substituted by the batch parser as:
use pubs

The batch parser will perform the substitution for any client tool.

In another aspect of the invention, an interactive or dynamic substitution can be made by the batch parser for input script by calling back to the software client tool user to assist in filling in the values for one or more variables the batch parser script requests. This call back to substitute unknown variables is made at run time and can be implemented using the IVariableResolver interface 330.

In another aspect of the invention, comments added to the input script for user readability are removed along with blank spaces and the comments are not returned for distribution to the database server via the tool. This aspect hides undesirable comments from downstream users and allows the user to minimize network traffic and thus can provide high performance batch processing on the database server supported by the tool.

In another aspect of the invention, the batch processor enables the referencing and inclusion of other files within the script. This aspect allows the caller a way to modify the currently processed script before it is executed. In addition, the batch parser enables the editing of the referenced files by permitting the call of a text editor of choice. This optional in-place modification of referenced files provides a useful flexibility in the programming environment. This aspect of the invention also allows the batch parser to ask the application to provide a modified context to the tool user interface. For example, the editor can show a user the result that could be obtained and that would be available to send to a tool database server before the batch script is actually run and results sent back to the tool for database distribution. In addition, the changes to the referenced file can be bound such that as the user changes the result of the file, the batch process script can change to realize the change in the reference file.

In another aspect of the invention, the batch parser can request execution of any shell command while processing the input script. This aspect is invoked via an ExecuteShellCommand call. This aspect allows an instruction, from a command line tool, for example, to be executed by the host tool. An example of this aspect would be the execution, with the batch parser script, of a host defined command to run a non-database command at a user console or terminal. A simple example would be the execution of a "dir" DOS-like command as part of the input script.

In another aspect of the invention, the batch parser can cause a script to connect to a different server specified in the script. This aspect is invoked via a Connect call. Use of this action can enable the batch parser to generate script to connect to various servers as shown in the example of FIG. 1.

In another aspect of the invention, the batch parser can redirect normal and error output to a different destination through a script command. This aspect permits the batch parser to call the Output to allow storage or display of normal scripting generation or error messages on a host system rather than a target database management system.

In one exemplary implementation, the batch parser component uses the following class definitions and interfaces:

```
class BatchParser
{
public:
    BatchParser( );
    ~BatchParser( );
    // ParseMode can have one of the following values
    // RecognizeAll -- recognizes variables, commands, batch delimiter
    // RecognizeOnlyVariables -- recognizes only variables
    // RecognizeOnlyBatchDelimiter -- recognizes only batch delimiter
    void SetParseMode(ParseMode pm);
    //cleans up internal state and prepare for a new parse
    void Cleanup( );
    // set new batch delimiter, default is GO
    void SetBatchDelimiter(const wchar_t* szBatchDelimiter);
    // set batch source interface : used for feeding text in
    void SetBatchSource(IBatchSource* pIBatchSource);
    // set command executer interface: processes commands and batches
    void SetCommandExecuter(ICommandExecuter* pICommandExecuter);
    // set variable resolver interface
    void SetVariableResolver(IVariableResolver* pIVariableResolver);
    // start parsing. flushBatchBuffer flag simulates batch delimiter
        when
    equals true
        ParserState Parse(bool flushBatchBuffer);
};
A client has to implement the following three interfaces required by
BatchParser component
interface IBatchSource
{
    // called by Parser when new data is need
    // when buff = 0 and cbLength = 0 the parsing ends.
    ParserAction GetMoreData(wchar_t** buff, size_t* cbLength);
};
interface IVariableResolver
{
    // Parser requests specific variable value from the user
    ParserAction ResolveVariable(const wchar_t* varName, const
        wchar_t**
varValue);
    // Command to delete a variable has been encountered
    ParserAction DeleteVariable(const wchar_t* varName);
    // Does user want to take ownership of the variable or let parser
handle it.
    ParserAction ResolveVariableOwnership(const wchar_t* varName,
        const
```

```
wchar_t* varValue, bool* bTakeOwnership) = 0;
};
interface ICommandExecuter
{
    // Number of times to execute batch
    ParserAction ProcessBatch(const wchar_t* batch, int num);
    // discared statement cache
    ParserAction Reset( ) = 0;
    // In-place editing of script
    ParserAction Ed(const wchar_t* batch, IBatchSource**
        ppIBatchSource);
    // Source returned by Ed call has been parsed and can now be
        freed
    ParserAction EdDone(IBatchSource* pIBatchSource);
    // Execute shell command within environment
    ParserAction ExecuteShellCommand(const wchar_t* command) = 0;
    // Exit environment
    ParserAction Quit( );
    // Exit but execute the last batch, return first column and first
        row
of the resultset
    ParserAction Exit(const wchar_t* batch, const wchar_t*
        exitBatch);
    // include file
    ParserAction IncludeFileName(const wchar_t* fileName,
        IBatchSource**
ppIBatchSource);
    // File has been parsed at the source and can now be released
    ParserAction IncludeFileNameDone(IBatchSource*
        pIBatchSource);
    // List servers available on the network
    ParserAction ServerList( );
    // Print content of the statement cache
    ParserAction List(const wchar_t* batch);
    // List variable value
    ParserAction ListVar(const wchar_t* varList);
    // Set destination for the error output
    ParserAction Error(OutputDestination od, const wchar_t*
        fileName);
    // Redirect query results
    ParserAction Out(OutputDestination od, const wchar_t*
        fileName);
    // Redirect performance trace
    ParserAction PerfTrace(OutputDestination od, const wchar_t*
        fileName);
    // Connect to a different server within environment
    ParserAction Connect(int timeout, const wchar_t* server, const
        wchar_t*
user, const wchar_t* password);
    // How to handle script errors
    ParserAction OnError(ErrorAction ea);
    // Switch XML mode on/off
    ParserAction Xml(XmlStatus xs);
    // Print list of supported commands
    ParserAction Help( );
};
```

The implementation presented above can implement the batch parser modes, batch splitting, automatic and dynamic token substitution, the stripping of comments and blanks, external file referencing and editing, execution of shell commands, different server connections, and redirecting of normal and error output as described above.

Exemplary Computing Device

Figure 4:
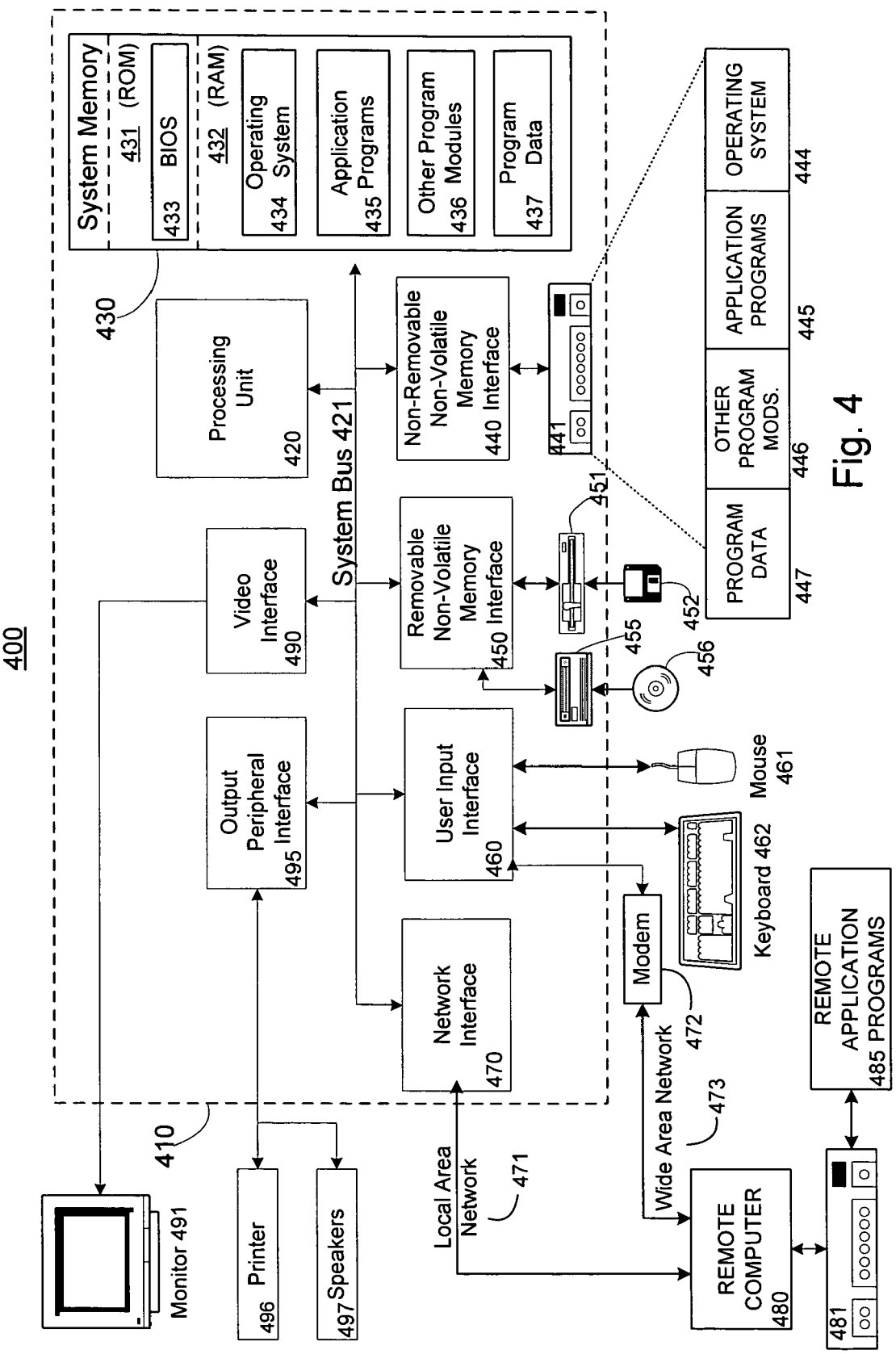
FIG. 4 is a block diagram showing an exemplary computing environment in which aspects of the invention may be implemented.

FIG. 4 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 4 thus illustrates an example of a suitable computing system environment 400 in which the embodiments of the invention may be implemented, although as made clear above, the computing system environment 400 is only one example of a suitable computing environment and is not intended to suggest any limitation as to the scope of use or functionality of an embodiment of the invention. Neither should the computing environment 400 be interpreted as having any dependency or requirement relating to any one or combination of components illustrated in the exemplary operating environment 400.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, non-volatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a componentized batch server. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of issuing commands to multiple database servers using a single script, the method comprising:

accessing the single script using a client software tool having access to multiple database servers, the script having parser-specific commands and a first set of database-specific commands;

selecting an operating mode of a batch parser from a plurality of operating modes comprising a first selectable operating mode in which the batch parser recognizes variables, commands, and batch delimiters, a second selectable operating mode in which the batch parser recognizes batch delimiters but not variables or commands, a third selectable operating mode in which the batch parser recognizes variables but not batch delimiters or commands, and a fourth selectable operating mode in which the batch parser cleans up internal batch parser states;

passing the script from the client software tool to the batch parser;

splitting, at the batch parser, the script into batches comprising parser-specific commands and the first set of database-specific commands, wherein a user-defined batch separator token is used to delimit batches and wherein a value following the user-defined batch separator token indicates a number of times a batch preceding the user-defined batch separator token is to be executed;

converting the parser-specific commands into a second set of database-specific commands;

passing the first set and the second set of database-specific commands back to the client software tool; and sending the first set and second set of database-specific commands to the multiple database servers for execution.

2. The method of claim 1, wherein the first set and the second set of database-specific commands are interleaved.

3. The method of claim 1, wherein converting the parser-specific commands comprises performing at least one of automatically substituting tokens in the parser-specific commamds with defined values and substituting tokens by requesting a token value via a client tool to make a substitution.

4. The method of claim 1, further comprising stripping off at least one of comments and blank spaces from at least one of the parser-specific commands and the database-specific commands before sending the first set and second set of database-specific commands to the multiple database servers.

5. The method of claim 1, further comprising referencing files before sending commands to the multiple database servers.

6. The method of claim 1, further comprising requesting a host computer to launch a text editor to perform at least one of viewing and editing a reference file before sending database-specific commands to the multiple database-servers.

7. The method of claim 1, further comprising requesting a host computer to launch a viewer to perform at least one of examining and editing a list of the first set and second set of database-specific commands before sending database-specific commands to the multiple database servers.

8. The method of claim 7, further comprising binding edits made to the list such that edits made to the list are reflected in the script.

9. The method of claim 1, further comprising executing parser-specific commands found in the script before sending database-specific commands to the multiple database servers.

10. The method of claim 1, wherein splitting further comprises splitting out shell commands directed to the client software tool.

11. The method of claim 1, further comprising requesting a connection to one or more servers specified in the script.

12. The method of claim 1, further comprising sending at least one of an error output and a normal output to a destination other than a database command execution target.

13. A method of generating commands for multiple database servers using a single script, the method comprising:

accessing the single script using a client software tool having access to the multiple database servers, the script having parser-specific commands and a first set of database-specific commands;

selecting an operating mode of a batch parser from a plurality of operating modes comprising a first selectable operating mode in which the batch parser recognizes variables, commands, and batch delimiters, a second selectable operating mode in which the batch parser recognizes batch delimiters but not variables or commands, a third selectable operating mode in which the batch parser recognizes variables but not batch delimiters or commands, and a fourth selectable operating mode in which the batch parser cleans up internal batch parser states;

passing the script from the client software tool to the batch parser;

splitting, at the batch parser, the script into batches comprising parser-specific commands and the first set of database-specific commands;

converting the parser-specific commands into a second set of database-specific commands;

passing the first set and the second set of database-specific commands back to the client software tool, wherein a user-defined batch separator token is used to delimit batches and wherein a value following the user-defined batch separator token indicates a number of times a batch preceding the user-defined batch separator token is to be executed; and storing the first set and second set of database-specific commands in preparation for multiple database server execution.

14. The method of claim 13, wherein storing comprises holding the first set and the second set of database-specific commands in at least one of temporary storage and longer term storage.

15. A system for generating commands for inserting data in multiple databases residing in multiple database servers via a single script, the system comprising:

at least one client tool, the client tool calling a batch server to support the generation of commands for a database;

a processor having access to memory, the memory having commands which, when executed, perform steps comprising:

accessing the single script and splitting the script into batches comprising parser-specific commands and a first set of database-specific insert commands using a client software tool having access to multiple databases, wherein a user-defined batch separator token is used to delimit batches and wherein a value following the user-defined batch separator token indicates a number of times a batch preceding the user-defined batch separator token is to be executed;

selecting an operating mode of a batch parser from a plurality of operating modes comprising a first selectable operating mode in which the batch parser recognizes variables, commands, and batch delimiters, a second selectable operating mode in which the batch parser recognizes batch delimiters but not variables or commands, a third selectable operating mode in which the batch parser recognizes variables but not batch delimiters or commands, and a fourth selectable operating mode in which the batch parser cleans up internal batch parser states;

passing the script from the client software tool to the batch parser;

converting the parser-specific commands into a second set of database-specific insert commands at least in part by using the at least one client tool to request a token value from a user and substituting a token in the parser-specific commands with the requested token value;

removing at least one of comments and blank spaces from at least one of the parser-specific commands and the database-specific insert commands before sending database-specific insert commands to a database server;

passing the first set and the second set of database-specific insert commands back to the client software tool; and connecting to a first server, the first server having a database responsive to at least one of a first set of commands and a second set of commands; and a communication link for connecting to at least one server.

16. The system of claim 15, further comprising:

a display having a user interface for viewing and editing at least one list of the first set of commands and the second set of commands.

17. The system of claim 15, wherein accessing and splitting the script comprises reading the script and calling a componentized parser.

18. The system of claim 15, wherein converting the parser-specific commands comprises automatically substituting at least one token in the parser-specific commands with a defined token value.

19. The system of claim 15, wherein the steps further comprise at least one of referencing files and requesting the launching of a text editor before sending commands to a database server.

20. The system of claim 15, wherein the steps further comprise executing parser-specific commands found in the script before sending database-specific commands to a database server.

21. The system of claim 15, wherein the batch server separates out shell commands directed to the at least one client tool.

22. A computer-readable storage medium having computer-executable instructions for performing a steps for issuing commands to multiple database servers via a single script, the steps comprising:

accessing the single script using a client software tool having access to multiple database servers, the script having parser-specific commands and a first set of database-specific commands;

selecting an operating mode of a batch parser from a plurality of operating modes comprising a first selectable operating mode in which the batch parser recognizes variables, commands, and batch delimiters, a second selectable operating mode in which the batch parser recognizes batch delimiters but not variables or commands, a third selectable operating mode in which the batch parser recognizes variables but not batch delimiters or commands, and a fourth selectable operating mode in which the batch parser cleans up internal batch parser states;

passing the script from the client software tool to the batch parser;

splitting, at the batch parser, the script into batches comprising parser-specific commands and the first set of database-specific commands, wherein a user-defined batch separator token is used to delimit batches;

converting the parser-specific commands into a second set of database-specific commands at least in part by using the client software tool to request a token value from a user and substituting a token in the parser-specific commands with the requested token value;

passing the first set and the second set of database-specific commands back to the client software tool; and sending the first set and second set of database-specific commands to the multiple database servers for execution.

23. The computer-readable storage medium of claim 22, wherein the first set and the second set of database-specific commands are interleaved.

24. The computer-readable storage medium of claim 22, wherein the step of converting the parser-specific commands comprises automatically substituting at least one token in the parser-specific commands with a defined token value.

25. The computer-readable storage medium of claim 22, wherein the steps further comprise requesting a host to launch a text editor to perform at least one of viewing and editing a reference file before sending database-specific commands to the multiple database servers.

26. The computer-readable storage medium of claim 22, wherein the steps further comprise requesting a host to launch a viewer to perform at least one of examining and editing a list of the first set and second set of database-specific commands before sending database-specific commands to the multiple database servers.

27. The computer-readable storage medium of claim 22, wherein the steps further comprise executing parser-specific commands found in the script before sending database-specific commands to the multiple database servers and splitting out shell commands directed to the client software tool.

28. A computer-readable storage medium having computer-executable instructions for performing a steps for generating commands for multiple database servers using a single script, the steps comprising:

accessing the single script using a client software tool having access to the multiple database servers, the script having parser-specific commands and a first set of database-specific commands;

selecting an operating mode of a batch parser from a plurality of operating modes comprising a first selectable operating mode in which the batch parser recognizes variables, commands, and batch delimiters, a second selectable operating mode in which the batch parser recognizes batch delimiters but not variables or commands, a third selectable operating mode in which the batch parser recognizes variables but not batch delimiters or commands, and a fourth selectable operating mode in which the batch parser cleans up internal batch parser states;

passing the script from the client software tool to the batch parser;

splitting, at the batch parser, the script into batches comprising parser-specific commands and the first set of database-specific commands, wherein a user-defined batch separator token is used to delimit batches and wherein a value following the user-defined batch separator token indicates a number of times a batch preceding the user-defined batch separator token is to be executed;

converting the parser-specific commands into a second set of database-specific commands;

passing the first set and the second set of database-specific commands back to the client software tool; and storing the first set and second set of database-specific commands in preparation for multiple database server execution.

29. The computer-readable storage medium of claim 28, wherein the step of storing comprises holding the first set and the second set of database-specific commands in at least one of temporary storage and longer term storage.

30. The computer-readable storage medium of claim 28, wherein the first set and the second set of database-specific commands are interleaved.

* * * * *